(12) United States Patent
Hegel

(10) Patent No.: US 7,089,155 B2
(45) Date of Patent: Aug. 8, 2006

(54) METHOD FOR REMOTELY DIAGNOSING PROCESS FLOWS IN SYSTEMS

(75) Inventor: Walter Hegel, Berlin (DE)

(73) Assignee: Korsch AG, Berlin (DE)

( * ) Notice: Subject to any disclaimer, the term of this patent is extended or adjusted under 35 U.S.C. 154(b) by 0 days.

(21) Appl. No.: 10/490,058

(22) PCT Filed: Sep. 20, 2002

(86) PCT No.: PCT/EP02/10615

§ 371 (c)(1),
(2), (4) Date: May 19, 2004

(87) PCT Pub. No.: WO03/026338

PCT Pub. Date: Mar. 27, 2003

(65) Prior Publication Data

US 2005/0038531 A1    Feb. 17, 2005

(30) Foreign Application Priority Data

Sep. 20, 2001 (DE) ............................. 101 46 351

(51) Int. Cl.
*G06F 19/00* (2006.01)
(52) U.S. Cl. .................. 702/183; 719/313; 709/217
(58) Field of Classification Search ............ 702/183, 702/184, 185, 188, 189; 709/217; 719/313; 438/106

See application file for complete search history.

(56) References Cited

U.S. PATENT DOCUMENTS 6,061,603 A    5/2000    Papadopoulos et al.
6,201,996 B1   3/2001    Crater et al.

FOREIGN PATENT DOCUMENTS

| DE | 199 61 920 A1 | 7/2001 |
| EP | 0 822 473 A   | 2/1998 |
| WO | WO 00 23894 A | 4/2000 |

OTHER PUBLICATIONS

"Carbon Copy PLUS User Guide, Section 1," Microcom Systems, Inc., Printed in Puerto Rico, 1989, pp. 1-1/1-3.
"Symantec pcANYWHERE 32 Version 8.0," Symantec Corporation, Printed in Ireland, 1993-1997, pp. 1, with concise English language explanation.

*Primary Examiner*—Edward Raymond
(74) *Attorney, Agent, or Firm*—Birch, Stewart, Kolasch & Birch, LLP

(57) ABSTRACT

The invention relates to a method for remotely diagnosing process conditions in systems such as tablet presses, using computer software. The aim of the invention is to develop a method, which overcomes the disadvantages of methods in prior art and ensures that no modifications, which lead to unintentional effects on the systems, can be made to the software. To achieve this, a programmable control system (PCS) and/or a computer, such as a personal computer (PC), is/are connected to an Internet server, such as a browser, in such a way that—the process image of all conditions and the entire parameterisation of the system (actual condition) is stored on the Internet on a protected home page and/or—the PCS and/or the PC is operated as a subscriber of an e-mail system and issues protected status messages via said system—and the installation and parameterisation of the components and the software are stored either in e-mail form or as a protected Internet page.

6 Claims, No Drawings

METHOD FOR REMOTELY DIAGNOSING PROCESS FLOWS IN SYSTEMS

The invention concerns a method for remote diagnosis of process states in systems such as tabletting machines using computer software as specified in the preamble to claim 1.

In many fields with production systems, it is the general state of the art to organize a remote service over the existing telephone connections and modems at the systems, by which means the system manufacturer can perform remote diagnosis at the system operator when malfunctions occur, and also correct the diagnosed faults.

There are a variety of systems for fault transmission and diagnosis that represent the current state of the art, for example radio transmission (using GSM, the standard for cell phones) and the transmission of "Short Message System" (SMS) messages.

From DE 199 61 920 A1 is known a method for remote setup, remote maintenance, remote parameterization and/or remote operation of a voltage system converter wherein a connection to a destination telephone number is established with a cell phone, permitting the transmission of data using the Internet Protocol. The destination telephone number can be used to communicate with devices that can be connected to the Internet.

Data from the voltage system converter is exchanged with the cell phone through an infrared interface, and is exchanged between the cell phone and an Internet server. Web pages are displayed on the cell phone's display. The data transmitted by the cell phone to the Internet browser is processed in the server or a connected computer and transmitted to the voltage system converter through the cell phone.

A disadvantage of this method is that the cell phone's capacity for text transfer via SMS is severely limited, and hence complex information simply cannot be presented in this manner. Unwanted/undesired or even desired alteration of the software is possible, which is undesirable particularly in the pharmaceutical industry.

Especially in industries with sensitive products, such as in the pharmaceutical industry, there are reservations about the method using a modem in terms of the security and reliability of the diagnosis and the resulting effect on operation of the system with the software programmed into it.

In the pharmaceutical industry, systems are qualified and validated to ensure that their functions are tested and thus that reproducible processes are ensured. Execution of the qualification/validation involves a very large expenditure in time, personnel and materials because all functions in all variations are tested.

However, the possibility cannot be ruled out that one of the functions no longer works in the prescribed manner as a result of a change. In this case, qualification/validation must be performed again. It is thus essential to ensure that no changes have been made in the system. This means that the pharmacist is prepared to live with a known fault that he knows how to handle if this avoids full [re]qualification/validation of the system.

The known prior art does not ensure that a programmer cannot make an intentional or unintentional change in the software that can impermissibly change the process parameters that have been set.

It must be impossible to manipulate the software. Only diagnosis to localize and correct faults should be possible via the remote service, but not changes to the installed software.

The object of the invention is to develop a method that avoids the disadvantages of the prior art methods and ensures that no changes which could have unintended effects on the system can be made to the software.

This object is attained according to the invention through the features of claim 1.

The method according to the invention is characterized in that either a stored program control system (SPS) and/or a computer (PC) is connected to an Internet server in such a way that the process image of all states and the complete parameterization of the system (actual state) are stored in a secure home page on the Internet, and/or the SPS and/or the PC is connected as a subscriber to an e-mail system and transmits status messages via this system in a secure manner and the installation and parameterization of the components and the software are stored either as e-mail or as a secure Internet site.

The process image of all states of the system, and thus the representation of the variables and their connections in the SPS, are stored in a home page on the Internet to which only selected persons have access.

In this way, not only the programmer performing service but also the operator's maintenance personnel can very quickly discover the state of the system at the operator's location.

It is advantageous here that one need not go to the system to do this, but can instead observe and monitor from the maintenance station, for example. In a manner similar to remote service, the system state can be diagnosed with great precision since the actual state is represented on the home page.

According to one embodiment, either the SPS and/or the PC is linked to an e-mail system as a subscriber and transmits status messages through this e-mail system. It is also possible for the system's SPS and/or the PC as an e-mail recipient to receive commands which can initiate specific diagnoses.

Rapid diagnosis is ensured in both cases, and there is no possibility at any time of changing the software in any way.

It is an advantage that the use of existing software diagnosis methods via remote service is retained, but the possibility of manipulation of the software is precluded.

The software elements that can be addressed via e-mail, and can start a diagnostic run for example, are likewise part of the existing and tested software. The diagnostic run that is started already contains elements of the tested software, i.e. qualification/validation of the system has already been performed. Thus rapid and reliable diagnoses are possible by this means.

A further advantage is that, due to the existing networking of the companies, adding an additional subscriber incurs no additional costs, since it is not necessary either to run a telephone line or to purchase a modem.

In contrast to telephone connections, which are not always available with consistent quality, communications problems play no role in the World Wide Web since no telephone connections need be established; instead, all information is already stored in the network in the event of diagnosis.

Additional advantageous embodiments result from the subclaims of the invention.

The invention is described in detail below using an example embodiment of the method of the invention for remote diagnosis of process states of tabletting machines.

The control concept for a tabletting machine comprises the following variants according to the invention:

- a stored program control system without connection to a bus or a PC, or
- multiple stored program control systems with multiple processors, or
- a stored program control system with multiple processors that in turn are coupled to a computer such as a PC through a bus network.

This PC runs the SCADA (Supervisory Control And Data Acquisition) HMI software (Human Machine Interface), which ensures operator prompting and also stores and evaluates all production parameters, and optionally prepares them for communication with any desired ERP system (Enterprise Resource Planning).

According to prior art, the practice to date has been to install telecommunications software such as pcANYWHERE on the PC (excerpt from the user manual "Symantec pcANYWHERE 32, Version 8.0," copyright © 1993-1997, Symantec Corporation) or Carbon Copy PLUS (excerpt from the User Guide "Carbon Copy PLUS," copyright © Microcom Systems, Inc., 1989). These programs are specifically intended to add remote control to a PC.

In addition, it has also been the practice to store on the PC the communications/programming software that made it possible to display and change the state of the SPS, provided the SPS was in the "programming" operating mode.

A disadvantage of this known system used hitherto is that it was not possible to ensure that a switch on the SPS is always set such that it is only in run mode (i.e., no programming mode is present).

The PC, in turn, was equipped with a modem that established the connection to the control site, for example the plant. A variety of safety functions were provided here. For instance, provision was made to ensure that the modem could only call back a predefined number, minimizing the danger of unauthorized intervention in the system. Moreover, it was possible to install pcANYWHERE and Carbon Copy Plus so that only a "read" mode is possible, but no "write" mode.

However, all of these mechanisms cannot provide one hundred percent assurance that

- unauthorized persons cannot obtain access in the event of a fault,
- the switch in the SPS or the parameters in the software are never set such that programming is possible,
- the communications software in the PC cannot be reprogrammed such that it provides "read AND write" possibilities.

These possible failures result because the known systems are primarily designed such that not only diagnosis but also correction of the fault takes place. Therefore, "write" functionality is always provided. While it can be turned off, this provides no certainty that it will not be turned on accidentally.

In accordance with the invention, as in the prior art, a PC is provided that is networked with the user-programmable control system (which has one or more processors) and can be used in two ways:

1. Observing the Process Image

The user-programmable control system and/or the PC, in contrast to conventional systems, is equipped with an Internet server that reproduces the complete process image of the SPS and/or the PC. This image is stored on a home page (for example the "Service" home page of Korsch AG or on the processor of the Internet server), which contains the instantaneous states of all machines.

2. Connection as Subscriber of an E-mail System

When problems occur, the process image is sent in the form of an e-mail, either automatically by the system or at the request of the user. If the Internet server and/or the e-mail sender is installed in the PC or in the SPS, not only the process image but also the complete image of the software database can be stored in the PC and sent. Furthermore, the individual screen images can likewise either be stored as secure Internet sites or can selectively be sent as e-mail in the event that the user makes use of remote service.

The invention claimed is:

1. A method for remote diagnosis of process states in a system using computer software, the system having a validated state and a non-validated state, wherein either a stored program control system (SPS) or a computer is connected to an Internet server in such a way that
   - a process image of all process states of the system and complete parameterization of the system (actual state) are stored in a secure home page on the Internet server;
   - the SPS or the PC is connected as a subscriber to an e-mail system and transmits status messages via the e-mail system in a secure manner, the computer software of the system being non-modifiable by the SPS or the computer during the remote diagnosis of the system to prevent the system from entering from the validated state into the non-validated state; and
   - installation and parameterization of components of the computer software are stored either as an e-mail or as a secure Internet site.

2. The method of claim 1, characterized in that programs are started by the e-mail that are used to perform controlled diagnoses in the system or to start specific functions from which the state of the system is deduced (online diagnosis).

3. The method of claim 1, characterized in that the parameterizations of the PC or the SPS and of files that are relevant for on-site diagnosis (offline diagnosis) are transmitted as the e-mail or as the secure home pages.

4. The method of claim 1, characterized in that the system automatically sends messages with varying content regarding critical states and maintenance, as an e-mail to a defined addressee.

5. The method of claim 1, characterized in that screen pages and screen contents of a Supervisory Control And Data Acquisition (SCADA) system and a Human Machine Interface (HMI) are stored on the Internet on the secure home page such that the screen contents produced for the user in offline diagnosis can be transmitted to the secure home page for analysis, troubleshooting, and diagnosis.

6. The method of claim 1, wherein the system is a tabletting machine.

* * * * *